United States Patent
Ishiyama et al.

(10) Patent No.: US 6,904,466 B1
(45) Date of Patent: Jun. 7, 2005

(54) MOBILE COMMUNICATION SCHEME WITHOUT HOME AGENTS FOR SUPPORTING COMMUNICATIONS OF MOBILE NODES

(75) Inventors: Masahiro Ishiyama, Tokyo (JP); Atsushi Inoue, Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/573,189

(22) Filed: May 19, 2000

(30) Foreign Application Priority Data

May 20, 1999 (JP) ............................................ 11-140373

(51) Int. Cl.[7] ........................ G06F 15/16; G06F 15/173
(52) U.S. Cl. ........................ 709/245; 709/224; 709/228; 709/207
(58) Field of Search ................................ 709/206–207, 709/203, 223–224, 228, 238, 242, 245, 204, 205

(56) References Cited

U.S. PATENT DOCUMENTS 6,088,725 A * 7/2000 Kondo et al. ............... 709/220
6,496,704 B2 * 12/2002 Yuan ........................... 455/466

FOREIGN PATENT DOCUMENTS

| JP | 09-214516 | 8/1997 |
| JP | 10-051449 | 2/1998 |

OTHER PUBLICATIONS

Network Working Group, Request for Comments 2002, Mobil IP Spec., Oct. 1996, pp. 15–79.
Network Working Group, Request for Comments 2136, Dynamic DNS Update, Apr. 1997, pp. 1–21.
Network Working Group, Request for Comments 2401 (pp. 1–66); Request for Comments 2402 (pp. 1–22); Request for Comments 2403 (pp. 1–7); Request for Comments 2404 (pp. 1–7); Request for Comments 2405 (pp. 1–10); Request for Comments 2406 (pp. 1–22); Request for Comments 2407 (pp. 1–32); Request for Comments 2408 (pp. 1–86); Request for Comments 2409 (pp. 1–41); Request for Comments 2410 (pp. 1–6); Request for Comments 2411 (1–11); Request for Comments 2412 (pp. 1–55); Ipsec Base Specification, Nov. 1998.

* cited by examiner

*Primary Examiner*—Ario Etienne
*Assistant Examiner*—Hussein El-chanti
(74) *Attorney, Agent, or Firm*—Foley & Lardner LLP

(57) ABSTRACT

The disclosed mobile communication scheme enables easy change of a connected location of a mobile computer on the IP network when the mobile computer leaves its home network, without requiring the use of a home agent, while providing a sufficient level of security. The mobile computer transmits a packet from a visited site network to a correspondent by encapsulating an inner packet having a home address as an original source address within an outer packet having a current location address as a source address. The correspondent which received this encapsulated packet recognizes the source addresses of the outer and inner packets of the encapsulated packet as the current location address and the home address of the mobile computer, respectively, so that the correspondent can transmit a packet to the mobile computer thereafter by encapsulating an inner packet having the home address as a final destination address within an outer packet having the current location address as a destination address.

16 Claims, 9 Drawing Sheets

|  | | HOME ADDRESS RESOURCE RECORD |
| DOMAIN NAME | AAAA | HAAAA |
| | | |

| ID | field | value |
|---|---|---|
| SPM1 | src<br>dst<br>SA | Haddr<br>CN<br>SAM1 |
| SPM2 | src<br>dst<br>SA | CN<br>Haddr<br>SAM2 |

| ID | field | value |
|---|---|---|
| SPC1 | src<br>dst<br>SA | CN<br>Haddr<br>SAC1 |
| SPC2 | src<br>dst<br>SA | Haddr<br>CN<br>SAC2 |

| ID | field | value |
|---|---|---|
| SAM1 | dst<br>proto<br>mode<br>SPI | CN<br>ESP<br>tunnel<br>c1 |
| SAM2 | dst<br>proto<br>mode<br>SPI | CoA1<br>ESP<br>tunnel<br>m1 |

| ID | field | value |
|---|---|---|
| SAC1 | dst<br>proto<br>mode<br>SPI | CoA1<br>ESP<br>tunnel<br>m1 |
| SAC2 | dst<br>proto<br>mode<br>SPI | CN<br>ESP<br>tunnel<br>c1 |

| ID | field | value |
|---|---|---|
| SAM1 | dst<br>proto<br>mode<br>SPI | CN<br>ESP<br>tunnel<br>c1 |
| SAM2 | dst<br>proto<br>mode<br>SPI | CoA2<br>ESP<br>tunnel<br>m1 |

| ID | field | value |
|---|---|---|
| SAC1 | dst<br>proto<br>mode<br>SPI | CoA2<br>ESP<br>tunnel<br>m1 |
| SAC2 | dst<br>proto<br>mode<br>SPI | CN<br>ESP<br>tunnel<br>c1 |

MOBILE COMMUNICATION SCHEME WITHOUT HOME AGENTS FOR SUPPORTING COMMUNICATIONS OF MOBILE NODES

BACKGROUND OF THE INVENTION

1. Field of the Invention

The present invention relates to a mobile computer device capable of carrying out communications while moving among a plurality of inter-connected networks, a computer management device for managing an address of the mobile computer, and a mobile computer device for carrying out cipher communications with the mobile computer, as well as a mobile communication method suitable for these devices.

2. Description of the Background Art

In conjunction with availability of computer systems in smaller sizes and lower costs and more enriched network environments, the use of computer systems has been rapidly expanded into a variety of fields, and there is also a transition from centralized systems to distributed systems. In this regard, in recent years, because of the advance and spread of the computer network technology in addition to the progress and improved performance of the computer system itself, it has become possible to realize not only a sharing of resources such as files and printers within an office but also communications (electronic mail, electronic news, file transfer etc.) with nodes or hosts outside of an office or organization, and these communications are now widely used.

In particular, in recent years, the use of the world's largest computer network called "Internet" has become very popular, and there are new computer businesses for connecting to the Internet and utilizing open information and services, or for providing information and services to external users who make accesses through the Internet. In addition, new technology is developed in relation to the use of the Internet.

Also, in conjunction with the spread of such networks, there are technological developments regarding the mobile computing. In the mobile computing, a user carries along a portable computer terminal and makes communications while moving over networks. In some cases, the user may change a location on a network while continuing the communication, so that there is a need for a scheme that manages a changing address of a mobile computer on a network during such a communication in order to route the communication content correctly.

In general, in the case of realizing the mobile computing, a router (home agent) for managing the visiting site information of the mobile computer is provided at a network (home network) to which the mobile computer belongs, and when the mobile computer is away from the home network, the mobile computer sends a registration message for indicating a current location to this home agent. When this registration message is received, the transmission of data destined to the mobile computer is realized via the home agent of the mobile computer, by carrying out the data routing control with respect to the mobile computer by encapsulating an IP packet destined to an original address of the mobile computer within a packet destined to a current location address of the mobile computer.

Figure 1:
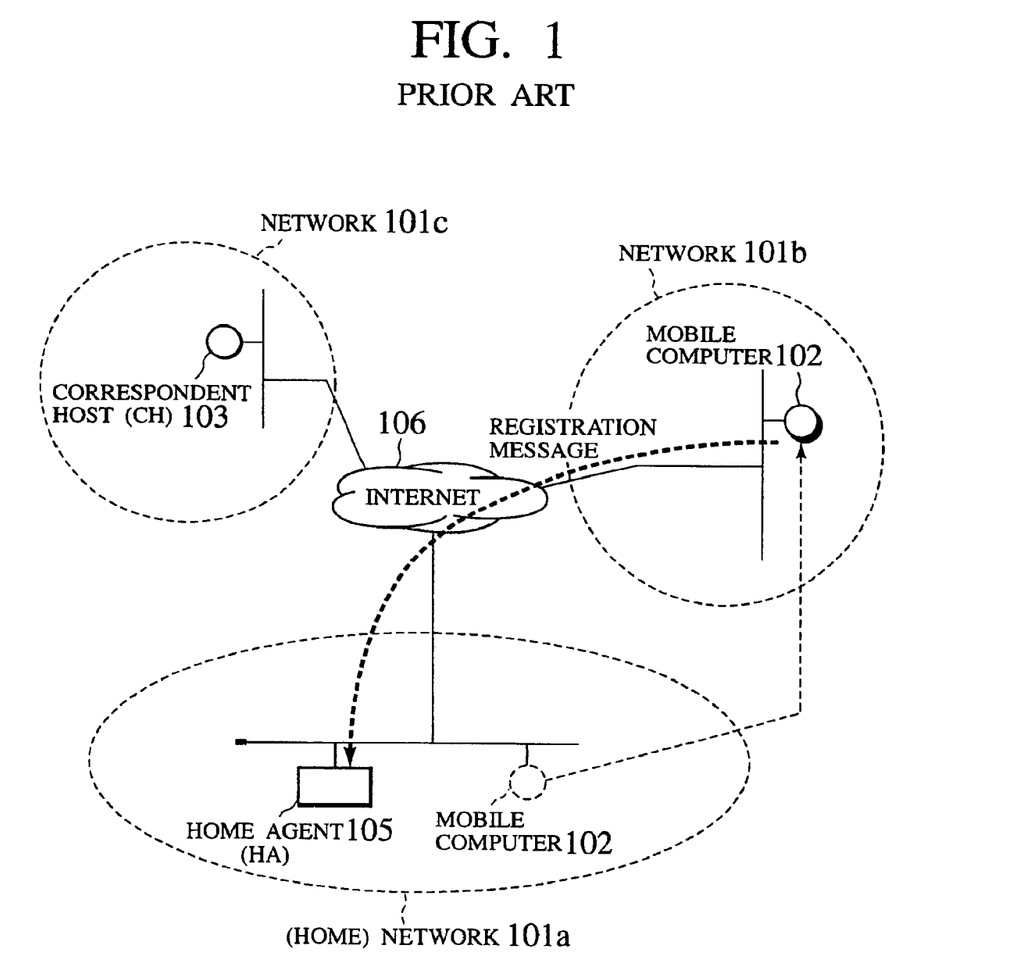
FIG. 1 is a schematic diagram for explaining a basic operation of the conventional Mobile IP scheme.

For example, in FIG. 1, this role is played by a home agent (HA) 105 when the mobile computer 102 that originally belongs to the home network 101a moves to another network 101b and carries out the communication with another computer (correspondent host: CH) 103 located within the other network 101c through the Internet 106. This is a scheme called Mobile IF which is currently in a process of being standardized by the mobile-IP working group of the IETF which is the standardizing organization for the Internet (see, IETF RFC 2002, IF mobility support (C. Perkins)).

The Mobile IP scheme aims at providing the mobility on the IP layer by continually using the same IP address even when a physical connection point on the network is changed. This mobility is superior to the so called nomadicity which simply enables a node to move from one network to another, in the following two respects: a loss of a session due to moving can be avoided, and an IP address can be used as a node identifier. For this reason, the Mobile IP is expected to be a protocol that can strongly support the mobile computing.

However, in the Mobile IP scheme, it is necessary to provide routers called home agents in order to support mobile nodes as described above. Also, in the Mobile IP scheme, there are cases involving triangular routes in the communications between a mobile node and the other host where a packet from the other host to the mobile node is transmitted via the home agent while a packet from the mobile node to the other host is transmitted without passing through the home agent.

These aspects of the Mobile IP scheme are expected to cause the following problems.

First, the home agent must be connected to a permanently connected network, and the mobile node cannot carry out any communications if the home agent falls to function properly. These facts weaken the robustness of the mobile communications.

Second, there is a mechanism called firewall which is indispensable in the current Internet environment, but the presence of a triangular route complicates the issue of firewall passing because the firewall cannot recognize a packet from the mobile node to the other host, for example.

SUMMARY OF THE INVENTION

It is therefore an object of the present invention to provide a mobile communication scheme capable of easily changing a connected location of a mobile computer on the IP network when the mobile computer leaves its home network, without requiring the use of a home agent, while providing a sufficient level of security.

According to one aspect of the present invention there is provided a method of mobile communications between a mobile computer capable of carrying out communications while moving over inter-connected networks and a correspondent computer, the method comprising the steps of: transmitting a packet to the correspondent computer from the mobile computer located at a visited site network outside a home network of the mobile computer, by encapsulating an inner packet having a home address assigned to the mobile computer at the home network as a source address, within an outer packet having a current location address acquired at the visited site network as a source address; storing cryptosystem parameter information necessary in forming a tunnel for transferring an encapsulated packet by encrypting the inner packet, at the mobile computer and the correspondent computer; notifying a change of the current location address of the mobile computer from the mobile computer to the correspondent computer by setting a new current location address as the source address of the outer packet in the packet transmitted by the transmitting step; updating the current location address used as a termination endpoint address of the tunnel in the cryptosystem parameter information stored at the mobile computer into the new current location address, when the current location address is changed to the new current location address; managing source addresses of the outer packet and the inner packet of the encapsulated packet received from the mobile computer respectively as the current location address and the home address of the mobile computer at the correspondent computer; and updating the current location address used as a termination endpoint address of the tunnel in the cryptosystem parameter information stored at the correspondent computer into the new current location address, when the change of the current location address to the new current location address is notified from the mobile computer.

According to another aspect of the present invention there is provided a method of mobile communications between a mobile computer capable of carrying out communications while moving over inter-connected networks and a correspondent computer, the method comprising the steps of: storing a current location address acquired by the mobile computer at a visited site network outside a home network of the mobile computer, and a home address assigned to the mobile computer at the home network, in correspondence to a host name of the mobile computer, at a computer management device; updating the current location address stored at the computer management device, according to a notification regarding the current location address received from the mobile computer; making an inquiry about the mobile computer from the correspondent computer to the computer management device, before initiating a packet transmission to the mobile computer at the correspondent computer; returning a response from the computer management device in response to the inquiry for the current location address of the mobile computer and the home address of the mobile computer received from the correspondent computer; and transmitting a packet from, the correspondent computer to the mobile computer located at the visited site network, by encapsulating an inner packet having the home address as a destination address, within an outer packet having the current location address as a destination address, when the current location address and the home address are obtained from the computer management device in response to the inquiry made by the correspondent computer.

According to another aspect of the present invention there is provided a mobile computer device capable of carrying out communications while moving over inter-connected networks, the mobile computer device comprising: a packet transmission unit configured to transmit a packet to a correspondent computer from a visited site network outside a home network of the mobile computer device, by encapsulating an inner packet having a home address assigned to the mobile computer device at the home network as a source address, within an outer packet having a current location address acquired at the visited site network as a source address; a memory configured to store cryptosystem parameter information necessary in forming a tunnel for transferring an encapsulated packet by encrypting the inner packet; and a current location address management unit configured to notify a change of the current location address of the mobile computer device to the correspondent computer by setting a new current location address as the source address of the outer packet in the packet transmitted by the packet transmission unit, and to update the current location address used as a termination endpoint address of the tunnel in the cryptosystem parameter information stored in the memory into the new current location address, when the current location address is changed to the new current location address.

According to another aspect of the present invention there is provided a computer management device provided in inter-connected networks on which a mobile computer carries out communications while moving over the inter-connected networks, the computer management device comprising: a memory configured to store a current location address acquired by the mobile computer at a visited site network outside a home network of the mobile computer, and a home address assigned to the mobile computer at the home network, in correspondence to a host name of the mobile computer; and a management unit configured to update the current location address stored in the memory according to a notification regarding the current location address received from the mobile computer, and to respond to an inquiry for the current location address of the mobile computer and an inquiry for the home address of the mobile computer received from a correspondent computer of the mobile computer.

According to another aspect of the present invention there is provided a correspondent computer device for carrying out communications with a mobile computer which is capable of carrying out communications while moving over inter-connected networks, the correspondent computer comprising: a memory configured to store cryptosystem parameter information necessary in forming a tunnel for transferring an encapsulated packet with respect to the mobile computer; and a mobile computer address management unit configured to manage source addresses of an outer packet and an inner packet of the encapsulated packet received from the mobile computer respectively as a current location address acquired by the mobile computer at a visited site network outside a home network of the mobile computer and a home address assigned to the mobile computer at the home network, and to update the current location address used as a termination endpoint address of the tunnel in the cryptosystem parameter information stored in the memory into a new current location address, when a change of the current location address to the new current location address is notified from the mobile computer.

According to another aspect of the present invention there is provided a correspondent computer device for carrying out communications with a mobile computer which is capable of carrying out communications while moving over inter-connected networks, the correspondent computer comprising: a mobile computer address management unit configured to make an inquiry about the mobile computer to a computer management device that manages a current location address acquired by the mobile computer at a visited site network outside a home network of the mobile computer and a home address assigned to the mobile computer device at the home network, before initiating a packet transmission to the mobile computer; and a packet transmission unit configured to transmit a packet to the mobile computer located at the visited site network, by encapsulating an inner packet having the home address as a destination address, within an outer packet having the current location address as a destination address, when the current location address and the home address are obtained from the computer management device in response to the inquiry made by the mobile computer address management unit.

It is also possible to provide computer usable medium having computer readable program codes for realizing any of the mobile computer device, the computer management device, and the correspondent computer device described above.

Other features and advantages of the present invention will become apparent from the following description taken in conjunction with the accompanying drawings.

DETAILED DESCRIPTION OF THE PREFERRED EMBODIMENTS

Referring now to FIG. 1 to FIG. 13, one embodiment of a mobile communication scheme according to the present invention will be described in detail.

First, the major features of the present invention are briefly summarized as follows.

As described above, in the conventional Mobile IP scheme, it is necessary to provide routers called home agents for supporting mobile computers. And as a result of this fact, there are cases involving triangular routes in the communications between a mobile computer and the other host where only a packet from the other host to the mobile computer is transmitted via the home agent. For these reasons, there have been drawbacks that the mobile communications are critically dependent on a reliability of the home agent, and that a policy control at a time of passing a firewall at the entrance of an enterprise network becomes difficult.

In the mobile communication scheme of the present invention, the mobile computer transmits a packet from a visited site network to a correspondent by encapsulating an inner packet having a home address as an original source address within an outer packet having a current location address as a source address. The correspondent which received this encapsulated packet recognizes the source addresses of the outer and inner packets of the encapsulated packet as the current location address and the home address of the mobile computer, respectively, so that the correspondent can transmit a packet to the mobile computer thereafter by encapsulating an inner packet having the home address as a final destination address within an outer packet having the current location address as a destination address.

Also, in this scheme, when the current location address of the mobile computer is changed to a new address, the mobile computer notifies the change of the own current location address to the correspondent by setting the new current location address as the source address of the outer packet of the encapsulated packet. Upon receiving this encapsulated packet, the correspondent can continue communications by changing only the destination address of the outer packet to the new current location address in the encapsulated packets to be transmitted thereafter.

On the other hand, when the own current location address is changed to a new address, the mobile computer also notifies the new current location address to a computer management device that manages the home address and the current location address of this mobile computer, and the computer management device updates the current location address of this mobile computer accordingly. In this case, a host that wishes to originate a call to the mobile computer sends a query to the computer management device, and if the current location address and the home address of the mobile computer are obtained as a response, this host transmits a packet to the mobile computer thereafter by encapsulating an inner packet having the home address as a final destination address within an outer packet having the current location address as a destination address similarly as described above.

In this way, the mobile communications of the mobile computer can be realized without any need for special routers such as home agents required in the Mobile IP scheme, and without any possibility for generating a triangular route.

Also, in the mobile communication scheme according to the present invention, it is possible to utilize the IPSEC (IP security protocol) tunnel, for example, as follows.

When the mobile computer obtains the current location address (Care-of address) at a visited site network, the mobile computer generates the IPSEC tunnel having this current location address as a tunnel termination endpoint, and carries out communications through this tunnel by encapsulating a packet using the home address.

When the mobile computer moves, the Care-of address is changed so that the termination endpoint of the IPSEC tunnel also changes, but it is possible to guarantee the mobility without interrupting the session by notifying the changed IPSEC tunnel terminal endpoint to the IPSEC module of the correspondent and changing the tunnel termination address in a security related database. Also, the DNS (Domain Name System) is expanded to provide an entry indicating a correspondence between the home address and the current Care-of address, such that when this entry indicates that the mobile computer is moving, a fixed host that wishes to originate a call to the moving mobile computer transmits a packet having the corresponding Care-of Address as the IPSEC tunnel destination to the mobile computer so as to construct the IPSEC tunnel to the correct tunnel termination endpoint, and thereby realizes the routing control to the correct current location without using a home agent, while maintaining the security of communication for a call that terminates to the mobile computer from the fixed host.

Thus according to the present invention, the mobile computer uses a security protocol on the IP layer while leaving from the home network, and changes the tunnel termination endpoint according to that protocol at a time of moving, such that it becomes easily possible to change a connected location on the IP network without requiring the use of a home agent, while providing a sufficient level of security. In addition, it also becomes possible to easily resolve a moved location of the mobile computer even in the case of communication for a call that terminates to the mobile computer from the other computer, by registering the tunnel termination endpoint information of the IP layer security protocol in the DNS, so that it becomes possible to transfer packets to the correct moved location. In this way, it is possible to construct a Mobile IP system that is far more easier to introduce compared with the conventional Mobile IP system.

Now, one embodiment of the mobile communication scheme according to the present invention will be described in further detail with references to the drawings.

Figure 2:
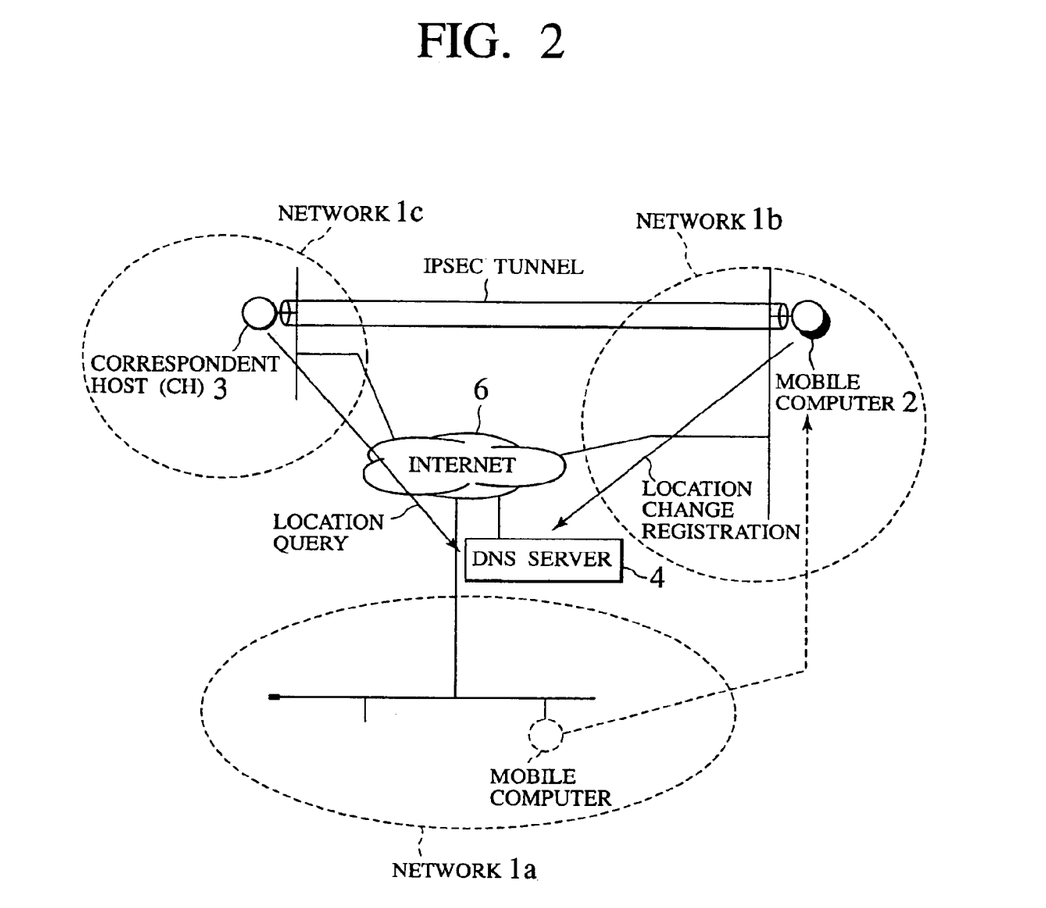
FIG. 2 is a schematic diagram showing an exemplary configuration of a mobile communication system according to one embodiment of the present invention.

FIG. 2 shows an exemplary basic configuration of a communication system according to this embodiment.

In the communication system of FIG. 2, a plurality of networks 1a, 1b and 1c are inter-connected through the Internet 6, and there is provided a DNS server 4 on the Internet 6. In the following, the description will be given for an exemplary case where a mobile computer 2 that belongs to the home network 1a has moved to another network 1b (or to still another network not shown in FIG. 2 from the network 1b) as a result of moving and carries out communications with a correspondent host 3 (which is assumed to be a fixed node) that is located in the network 1c.

Note that the DNS server 4 used in this communication system of FIG. 2 has an extra field in addition to the usual fields provided in the conventional DNS server, in order to manage the current location address of the mobile computer 2 (as well as whether the mobile computer has moved or not) as will be described in further detail below.

In this embodiment, the tunnel mode of the IPSEC will be utilized for communications between the moving mobile computer 2 and the correspondent host 3. For details of the IPSEC, see RFC 2401 to RFC 2412.

Figure 3:
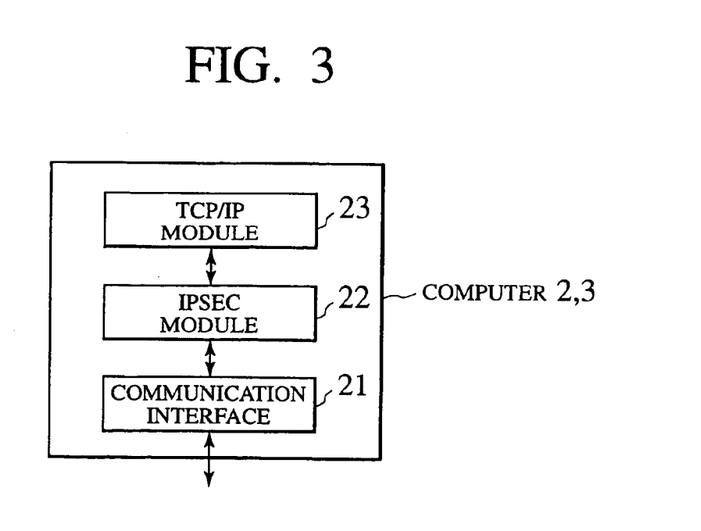
FIG. 3 is a block diagram showing an exemplary basic configuration of a mobile computer and a correspondent host in the mobile communication system of FIG. 2.

FIG. 3 shows an exemplary internal configuration of the mobile computer 2 in this embodiment.

The mobile computer 2 of FIG. 3 has a communication interface 21 for making a connection to the network, a TCP/IP module 23 for carrying out ordinary TCP/IP communications, and an IPSEC module 22 for carrying out IPSEC communications called tunnel mode. In the tunnel mode IPSEC communications, the packet encapsulation and the encryption/decryption of the inner packet are carried out and the IPSEC module 22 has functions for realizing such encapsulation and encryption/decryption processing.

Also, the mobile computer 2 has one address by which it is uniquely identifiable. This address will be referred to as a home address (Haddr). The home address is assigned at the home network of the mobile computer 2. Also, the mobile computer 2 acquires at least one appropriate address at a visited site network. This address will be referred to as a Care-of address (CoA).

In the case of the tunnel mode IPSEC communications, the IP address (CoA) assigned to the communication interface 21 will be used as an address (gateway address) indicating one endpoint (termination endpoint) of the tunnel of the tunnel mode IPSEC communications in the mobile computer 2 of FIG. 3. On the other hand, the Haddr will be used as a source address in the inner packet of the encapsulated packet.

Also, the IPSEC module 22 of the mobile computer 2 carries out a processing to update the CoA to be used in this mobile computer 2 when this mobile computer 2 has moved. In addition, the mobile computer 2 also carries out a processing to notify the newly acquired CoA to the DNS server 4 at this point.

Note that the correspondent host 3 which is capable of communicating with the mobile computer 2 also has a configuration basically similar to that of FIG. 3. However, the IPSEC module of the correspondent host 3 carries out a processing to update the CoA of the mobile computer 2 to be used at the correspondent host 3 according to information received from the mobile computer 2, instead of a processing for updating the CoA at the mobile computer 2. Also, the correspondent host 3 carries out a processing for inquiring the CoA of the mobile computer 2 to the DNS server 4 at a time of originating a call to the mobile computer 2 from the correspondent host. Also, the correspondent host 3 uses the same address (which is assumed to be CN) for the two addresses to be used in the outer packet and the inner packet in the tunnel mode IPSEC communications.

Of course, it is also possible to Implement both of the functions required for the mobile computer 2 and the functions required for the correspondent host 3 in a single computer.

Figure 4:
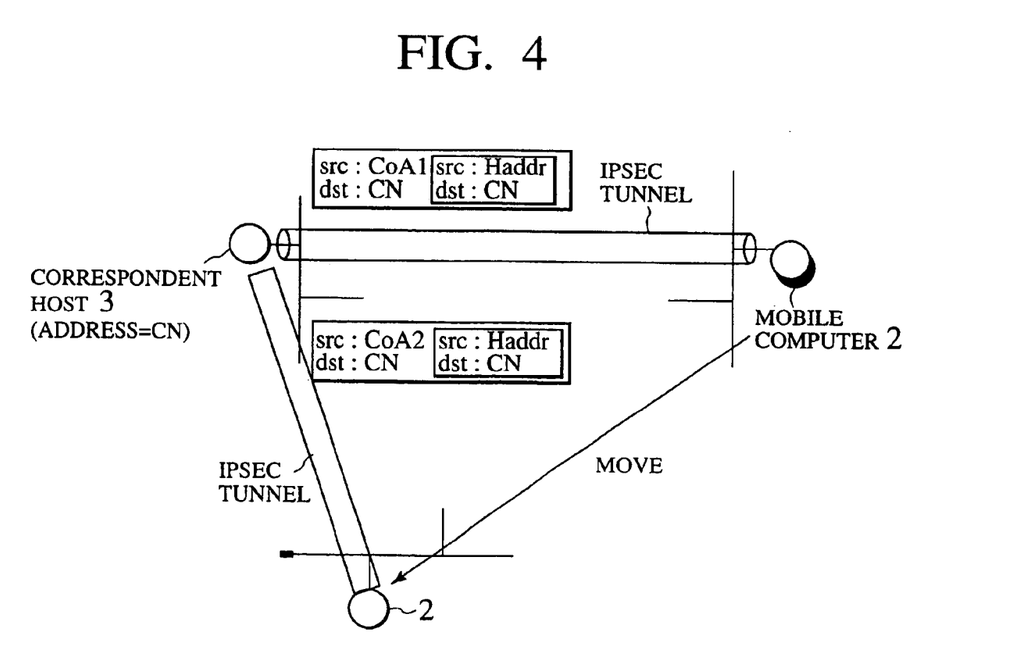
FIG. 4 is a schematic diagram for explaining operations in the case where the mobile computer changes a connected location in the mobile communication system of FIG. 2.

FIG. 4 shows an exemplary situation in which a packet is transferred from the mobile computer 2 to the correspondent host 3 using the IPSEC tunnel.

The mobile computer 2 itself acquires the Care-of address (which will be referred to as CoA1 below) indicating the current location in the visited site network (which is assumed to be the network 1b here). Thus the mobile computer 2 is operated by the Co-located Care-of address as specified in the RFC 2002.

As described above, the mobile computer 2 carries out communications here by using this acquired Care-of address (CoA1) as an address (gateway address) indicating one endpoint of the tunnel according to the tunnel mode IPSEC communications rather than an original source address of the IP packet itself, and using the home address (Haddr) as the original source address of the IP packet itself.

Namely, as shown in FIG. 4, the mobile computer 2 transmits an encapsulated packet in which the outer packet has the source address="CoA1" and the destination address ="CN", and the inner packet has the original source address="Haddr" and the final destination address="CN".

Next, when the mobile computer 2 moves further and the Care-of address is changed from "CoA1" to "CoA2" as shown in FIG. 4, the address changing is carried out as follows.

In this case, the mobile computer 2 changes the source address of the outer packet of the encapsulated packet to be transmitted to the IPSEC tunnel by the mobile computer 2 into "CoA2" at a timing when the Care-of address is changed to "CoA2". As a result, as shown in FIG. 4, the encapsulated packet in which the outer packet has the source address ="CoA2" will be transferred.

Figure 9A:
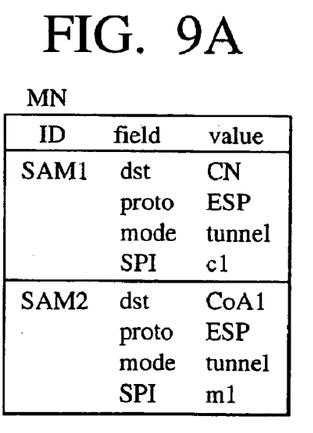
FIGS. 9A, 9B, 9C and 9D are diagrams showing exemplary security association databases for the mobile computer and the correspondent host according to IPSEC that can be used in the mobile communication system of FIG. 2.
Figure 9B:
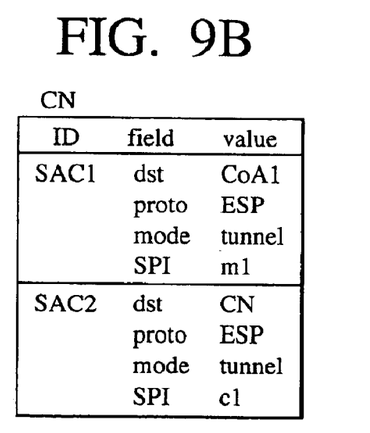
Figure 9C:
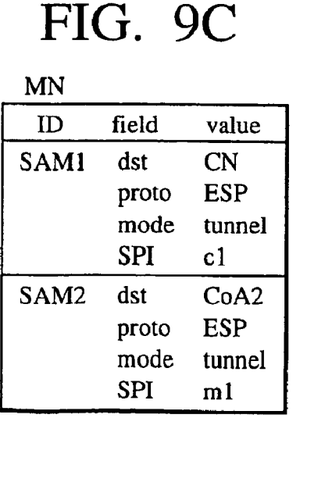
Figure 9D:
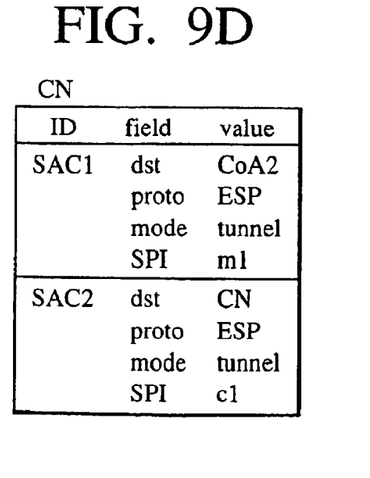

The correspondent host 3 that detected this change of the Care-of address of the mobile computer 2 then replace the destination gateway address "CoA1" used so far in this session by a new one "CoA2" by referring to the IPSEC security association (security related information) database (see FIG. 9B and FIG. 9D).

In the above described CoA updating, the security association information other than the gateway address will remain unchanged, so that there is no need to re-negotiate keys for IPSEC encryption and authentication, for example, and therefore it is possible to realize a fast location changing procedure.

Also, in this embodiment, the mobile computer 2 issues an update message with respect to the DNS server 4 at a timing when the Care-of address is changed.

Here, the DNS server 4 has an extra field called home address resource record field (HAAAA) for registering the home address (Haddr) of the mobile computer in addition to the usual fields (for registering a domain name, an address record (AAAA in IPv6, etc.). Moreover, the address record (AAAA in IPv6) registers Haddr when the mobile computer is not moving or CoA when the mobile computer is moving.

When the mobile computer 2 acquires a new Care-of address at the visited site, the address record is dynamically updated so that when this address record and the HAAAA field are different, it can be ascertained that the mobile computer 2 is connected by acquiring the Care-of address at the visited site.

Figure 5:
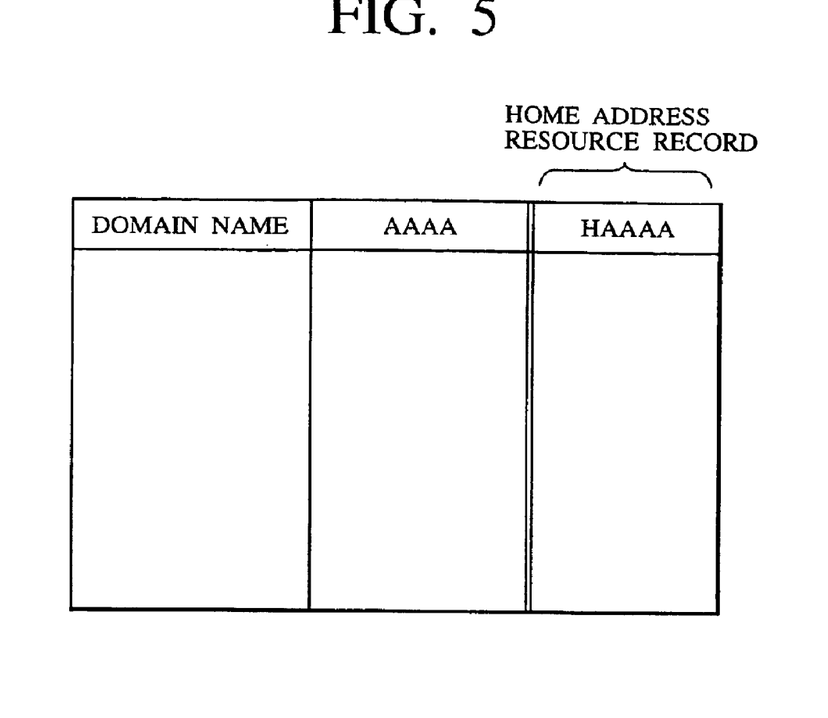
FIG. 5 is a diagram showing an exemplary data format used in a DNS server in the mobile communication system of FIG. 2.

FIG. 5 shows an exemplary data format of the DNS server 4. Note that FIG. 5 only shows three fields mentioned above and omits the other fields.

Note that the HAAAA inquiry with respect to the DNS server 4 and the dynamic updating of the HAAAA field and the address record can be defined easily in analogy to the conventionally used IP address inquiry and dynamic DNS update (see RFC 2136, for example).

The HAAAA information on the DNS server 4 is used when the correspondent host 3 initiates a packet transmission to the mobile computer 2 for a call to be terminated at the mobile computer 2, for example. Namely, the correspondent host 3 makes an inquiry with respect to the DNS server 4 and transmits a packet to a correct current location of the mobile computer 2 whose Care-of address is registered in the DNS server 4, in a sequence of forming a security association by setting the Care-of address as the destination address (gateway address) of the tunnel (see FIGS. 9A to 9D) and transmitting a packet using the IPSEC tunnel mode.

Here, the processing according to the IPSEC will be outlined. For details of the IPSEC, see RFC 2401 to RFC 2412.

The IPSEC processing is carried out according to the contents described in the security association. The security association is a set of information regarding the IPSEC which is uniquely defined from a set of the security parameter index (SPI) and dst (destination address). The SPI is an index given by 32 bits integer to be used in specifying the security association, which is described in an AH (Authentication Header) or ESP (Encapsulating Security Payload) header and used in selecting the security association. The major contents to be described in the security association Include dst, SPI, protocol (ESP or AH), for example), mode (tunnel, for example), and algorithm and keys, to be used in AH or ESP.

In order to use the IPSEC, a procedure for making agreement regarding the contents of the security association with the correspondent is carried out before the use of the IPSEC. The management of the security association is a role to be played by the key management protocol.

In the case of transmitting a packet, the IPSEC module first searches through a security policy database (SPD). The SPD selects a security policy according to appropriate elements such as src/dst of a packet of interest. The security policy specifies actions such as discarding the packet (discard), passing the packet as it is (bypass), and carrying out the IPSEC processing (apply). When the security policy is "apply", the security association (or a condition to be satisfied by the security association) to be used is also described. When the security policy is "apply", the security association to be used is specified so that the IPSEC module processes a packet of interest according to the contents described in that security association. When there is no security association, the exchange of the security association is carried out using an appropriate key exchange protocol.

On the other hand, when a packet to which the IPSEC is applied is received, the IPSEC module first determines the security association from dst (which is normally the node that received this packet) and the SPI, and carries out the IPSEC processing according to the contents described in the security association. Then, the IPSEC module obtains the security policy by searching out the SPD according to the packet obtained by the IPSEC processing. Then, whether the security association derived from the security policy coincides with the security association used in processing this packet or not is checked.

In the following, the mobile communication scheme of this embodiment will be described in further detail.

First, the DNS server 4 of this embodiment will be described in detail.

In the DNS server 4, a new resource record type is defined. This new record type is referred to as the home address record type. This home address record type maintains the home address of the mobile computer.

In this embodiment, the DNS server 4 is used in order to manage a correspondence between Haddr and CoA of the mobile computer 2. It is assumed that this DNS server 4 is always used when the correspondent host 3 originates a call to the mobile computer 2.

In the case of converting the fully qualified domain name (FQDN) into the IP address using the DNS server 4, a library collecting functions such as inquiry to the DNS server 4 is usually used. This library is often referred to as resolver. In this embodiment, this resolver is to be modified.

The usual resolver simply obtains the address record (AAAA in IPv6) for the conversion from FQDN into IP address, but in this embodiment, the home address resource record (HAAAA) is also inquired in addition to the address record. If the HAAAA record exists and its value differs from the AAAA record value, it implies that this mobile computer is moving. This is because the mobile computer is utilizing the dynamic DNS update (RFC 2136) so that the current CoA of the mobile computer will be indicated in the response.

The resolver used in this embodiment notifies the key management protocol function to set up the security association of the tunnel mode IPSEC between the AAAA address and the own node and returns the HAAAA record to the application when the HAAAA record exists and its value differs from the AAAA record value. If the HAAAA record does not exist, this resolver returns the AAAA record similarly as the usual resolver. Thus the resolver of this embodiment is compatible with the conventional scheme so that the use of this resolver does not preclude communications with existing nodes.

When a conventional host that does not have the resolver function of this embodiment carries out communications with the mobile computer 2 of this embodiment, the mobile computer 2 receives a packet with the CoA used as the destination address. In this case, the mobile computer 2 sets the security policy with respect to this host that transmitted the received packet as "bypass", and continues communications. Thus communications are possible but only the nomadicity is supported and the mobility of the Mobile IP is not supported.

In this embodiment, it is assumed that the mobile computer 2 always uses the IPSEC in the tunnel mode at a time of making a connection to the correspondent host 3, the appropriate existing key management protocol is followed at a time of exchanging the security association with the correspondent host 3, but it is set such that the CoA will be used as an address indicating one endpoint of the tunnel on the mobile computer 2 side and a key associated with the Haddr will be used as a key of the mobile computer 2. The Haddr will be used as the source address of the actual communication packets (TCP, etc.) that are transmitted through the tunnel. Thus the application on the mobile computer 2 carries out communications using the Haddr.

When the IPSEC is not available for some reason, the mobile computer 2 sets the security policy with respect to the correspondent host 3 as "bypass", and carries out communications using the CoA as the source address without using the IPSEC. This is the case where the correspondent is a huge public Web server which refuses to allocate resources to the IPSEC, for instance.

The mobile computer 2 of this embodiment carries out the following three operations whenever the moving over the network is completed.

(1) Dynamic DNS Update (Registration of the own current location):

The mobile computer 2 updates the current location address information (AAAA field in the case of IPv6) in the DNS server 4 using the dynamic DNS update (RFC 2136) or the like.

(2) SA Gateway Update (Request for changing the security association to the correspondent):

The mobile computer 2 searches through the own security association database (SAD) to find those which have the dst field different from the own current address, and issues a request to change the previous CoA used as the destination in the security association into the current CoA, with respect to every such address. This operation is referred to as the SA Gateway Update.

(3) SA Local Update (Change of the own security association):

The mobile computer 2 changes the previous CoA used in the dst field of each own security association into the current CoA.

Note that, similarly as the compatibility of the HAAAA resolver described above, when the correspondent host is not compatible with the SA Gateway Update of this embodiment, It is still possible to carry out communications but only the nomadicity will be supported.

Figure 6:
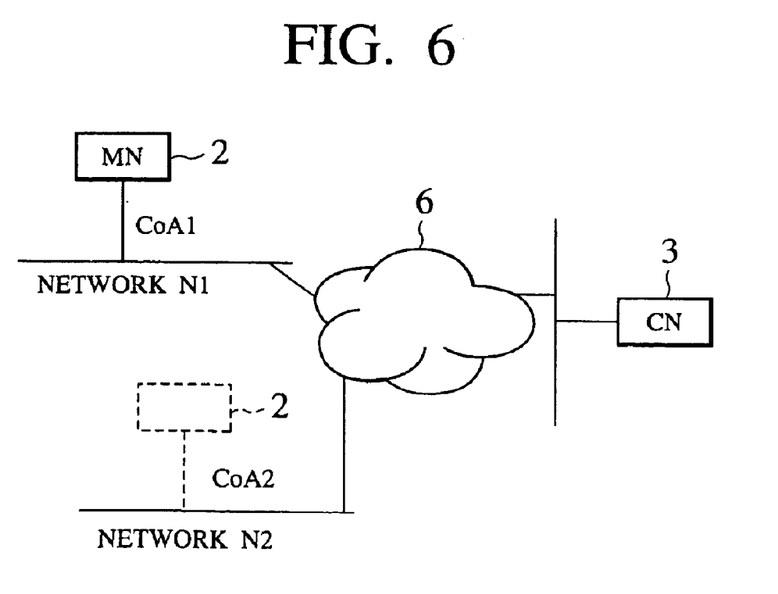
FIG. 6 is a schematic diagram showing an exemplary situation in which mobile communications are carried out in the mobile communication system of FIG. 2.

Next, the operation procedure according to this embodiment will be described for an exemplary network in which the mobile computer (mobile node MN) 2 and the correspondent host (correspondent node CN) 3 are connected as shown in FIG. 6.

In the exemplary case shown in FIG. 6, the mobile computer 2 (assumed to have CoA =CoA1) located on a network N1 carries out communications with the correspondent host 3 located on another network.

Figure 7:
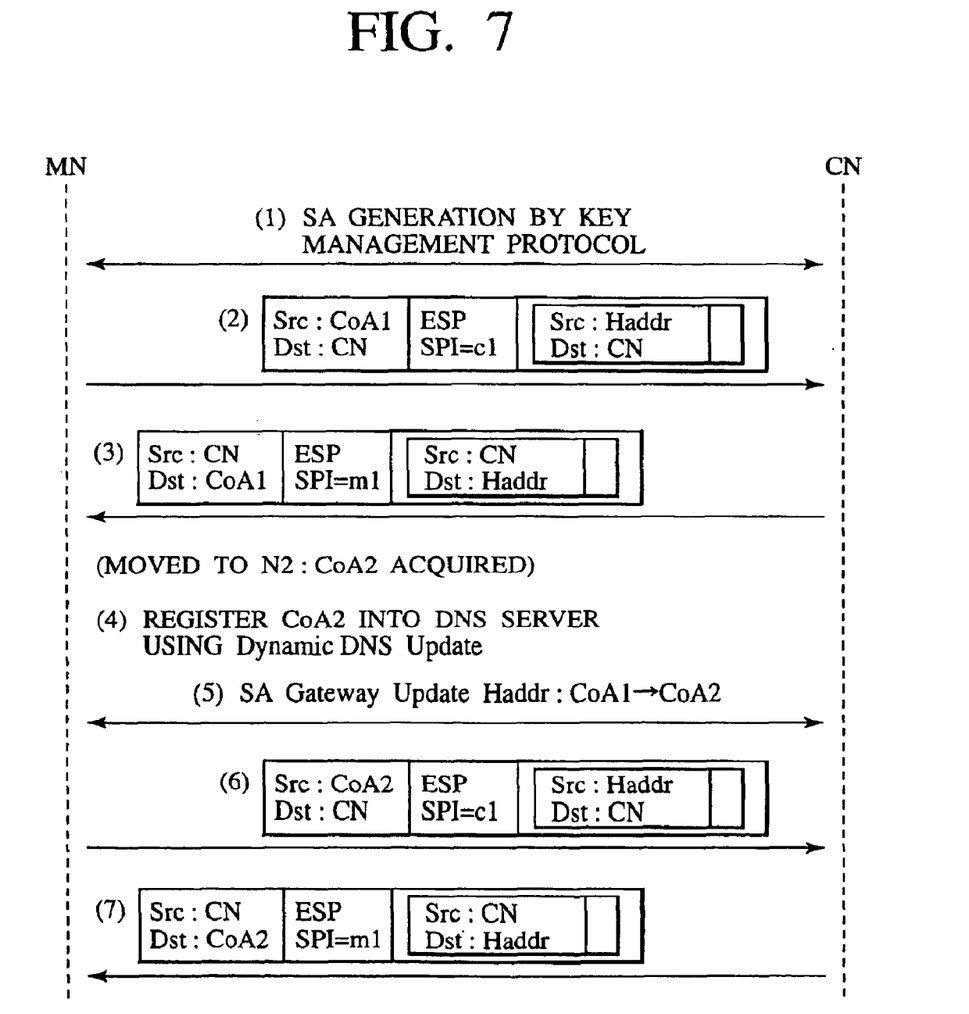
FIG. 7 is a sequence chart showing an exemplary processing sequence in the case where the mobile computer initiates communications at a visited site and then changes a location in the mobile communication system of FIG. 2.

FIG. 7 shows an exemplary operation sequence in this case.

First, the mobile computer 2 generates the security association with respect to the correspondent host 3 using an appropriate key exchange protocol (the operation (1) of FIG. 7).

Figure 8A:
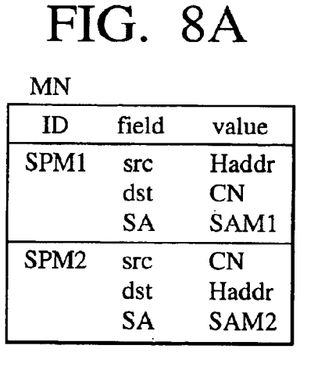
FIGS. 8A and 8B are diagrams showing exemplary security policy databases for the mobile computer and the correspondent host according to IPSEC that can be used in the mobile communication system of FIG. 2.
Figure 8B:
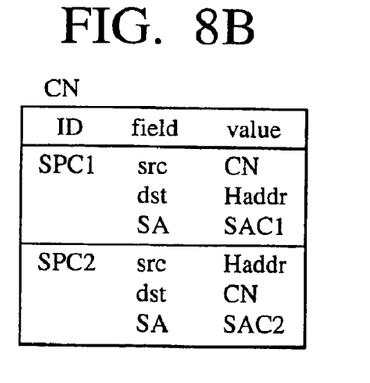

FIGS. 8A and 8B show exemplary security policies to be generated for the mobile computer 2 and the correspondent host 3 respectively. Also, FIGS. 9A and 9B show exemplary security associations to be generated for the mobile computer 2 and the correspondent host 3 respectively. Here it is assumed that the IPSEC protocol to be used is ESP.

When the mobile computer 2 wishes to transmit a packet to the correspondent host 3, the IPSEC module searches through the SPD as shown in FIG. 8A and selects $SPM_1$. In this SPM1 it is described that SAM1 should be referred to as the security association, so that the mobile computer 2 refers to SAM1 of FIG. 9A. This SAM1 specifies "CN" as the destination, "ESP" as the protocol", and "tunnel" as the mode, so that the mobile computer 2 encapsulates a packet to be transmitted from the mobile computer 2 to the correspondent host 3 according to the IPSEC, and transmits this encapsulated packet by setting "CN" as its destination and "c1" as its SPI and attaching ESP therein (the operation (2) of FIG. 7).

When this packet reaches to the correspondent host 3, the correspondent host 3 searches for the security association with (dst, SPI)=(CN, c1) in the SAD as shown in FIG. 9B, Then, using the security association so obtained, the correspondent host 3 verifies ESP and decapsulates the packet to obtain a packet to be transmitted from the mobile computer 2 to the correspondent host 3.

A packet to be transmitted from the correspondent host 3 to the mobile computer 2 is also similarly processed (the operation (3) of FIG. 7).

Here, applications on the mobile computer 2 and the correspondent host 3 recognize all communications as being carried out between "Haddr"and "CN", but packets that actually flow through the network are packets between "CoA1" and "CN".

Now, suppose that the mobile computer 2 has moved to a network N2 and acquired "CoA2" there in FIG. 6.

At a time of moving, the mobile computer carries out the following three operations.

(1) Dynamic DNS Update:

The mobile computer 2 registers the current CoA "CoA2" into the AAAA field corresponding to the mobile computer 2 (the operation (4) in FIG. 7).

(2) SA Gateway Update:

The mobile computer 2 searches through the own SAD of FIG. 9A for those security associations in which the dst field is not "CoA1", and finds one with the dst field ="CN" (i.e., SAM1 of FIG. 9A), so that the mobile computer 2 carries out the SA Gateway Update with respect to this correspondent host "CN" Indicated in this security association (the operation (5) of FIG. 7). As a result, the contents of the corresponding security association SAC1 of FIG. 9B at the correspondent host "CN" is updated as shown in FIG. 9D.

(3) SA Local Update:

The mobile computer 2 searches through the own SAD of FIG. 9A and updates those with the dst field ="CoA1" by changing "CoA1" to "CoA2". As a result, the contents of the security association SAM2 of FIG. 9A at the mobile computer 2 is updated as shown in FIG. 9C.

As a result of these operations, at the correspondent currently communicating with the mobile computer 2, the endpoint of the IPSEC tunnel is changed from "CoA1" to "CoA2" as the destination of all the security associations is changed to the current CoA "CoA2". Consequently the session is guaranteed even when the mobile computer 2 moves (the operations (6) and (7) of FIG. 7).

Next, the call origination from some node to the mobile computer 2 will be described for an exemplary case where the correspondent host 3 originates a call to the mobile computer 2 located in the network N1 in FIG. 6.

Figure 10:
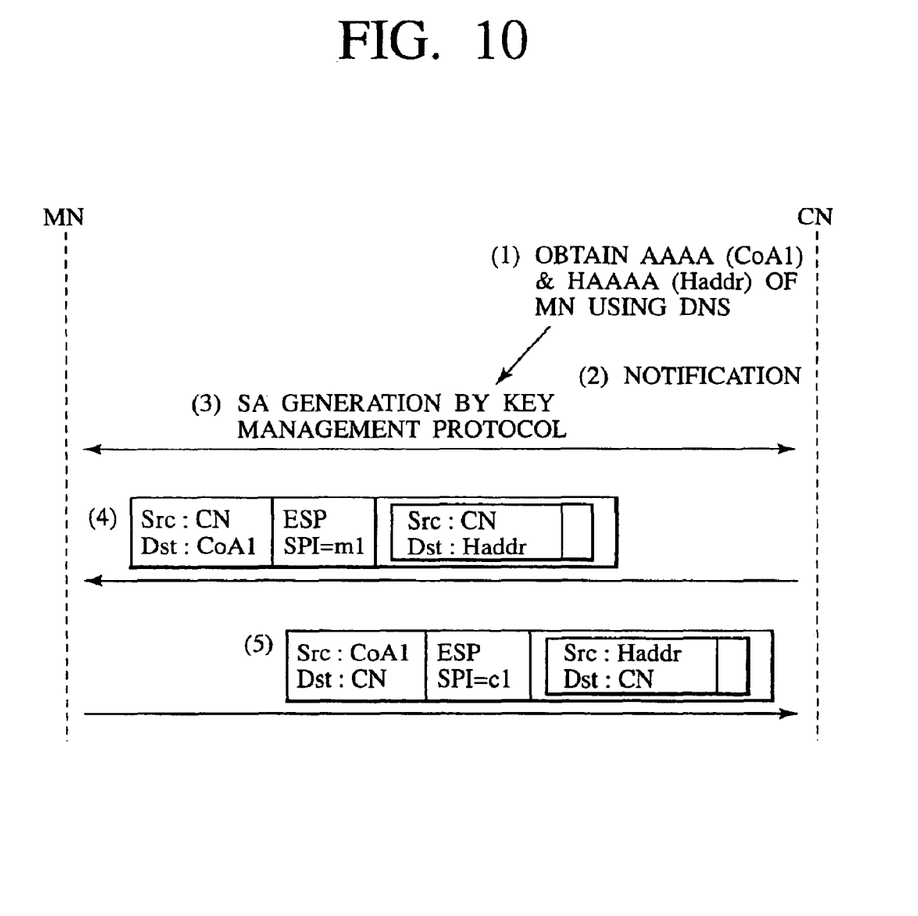
FIG. 10 is a sequence chart showing an exemplary processing sequence in the case where the correspondent host initiates a packet transmission to the mobile computer in the mobile communication system of FIG. 2.

FIG. 10 shows an exemplary operation sequence in this case.

When the application on the correspondent host 3 wishes to originate a call to the mobile computer 2, the address resolution using DNS is attempted first. The resolver on the correspondent host 3 inquires the AAAA record of the mobile computer 2 and obtains "CoA1" of the mobile computer 2. Then, the resolver also inquires the HAAAA record and obtains "Haddr" of the mobile computer 2 (the operation (1) of FIG. 10).

When the HAAAA record is obtained, the resolver requests an appropriate key management protocol to set up the security association for the IPSEC tunnel using "CoA1" (the operation (2) of FIG. 10).

When the key management protocol is finished, the security policies as shown in FIGS. 8A and 8B and the security associations as shown in FIGS. 9A and 9B are set up respectively in the mobile computer 2 and the correspondent host 3 similarly as in the above (the operation (3) of FIG. 10).

The resolver then returns the Haddr to the application.

The subsequent operations are basically similar as in the above (the operations (4) and (5) of FIG. 10).

Figure 11:
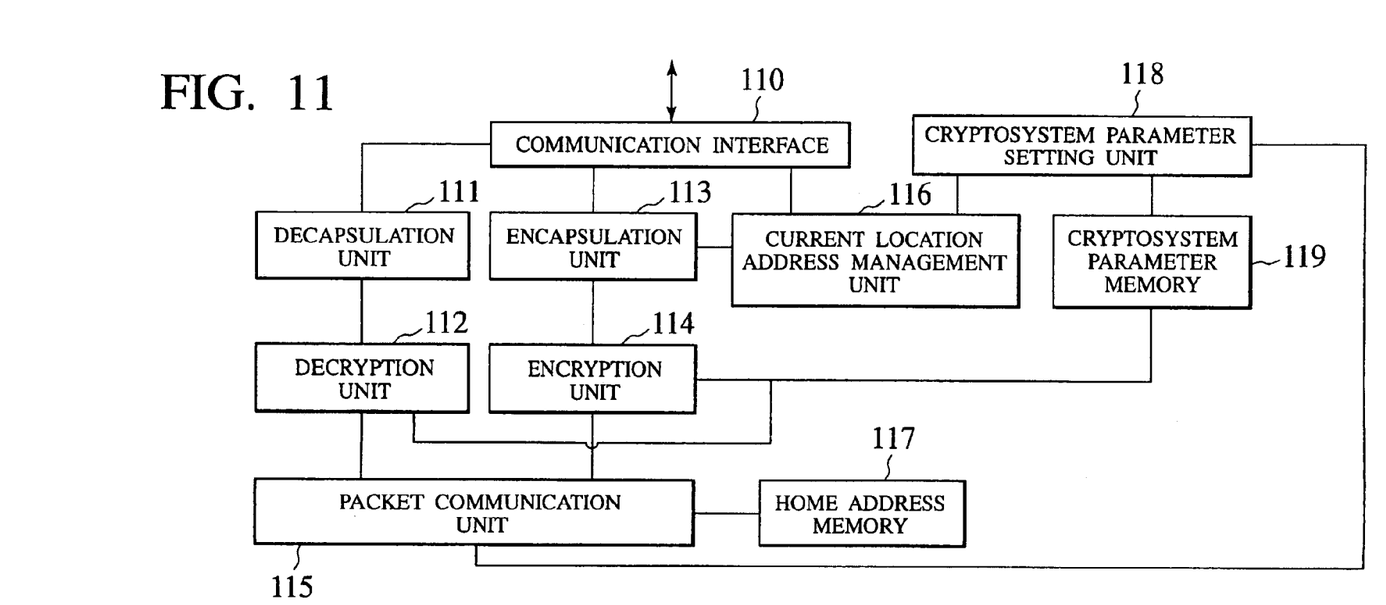
FIG. 11 is a block diagram showing an exemplary internal configuration of the mobile computer in the mobile communication system of FIG. 2.

In further detail, the mobile computer 2 of this embodiment has an exemplary internal configuration as shown in FIG. 11, which comprises a communication interface 110, a packet communication unit 115 for receiving or generating communication packets, a decapsulation unit 111 and a decryption unit 112 for carrying out the decapsulation and the decryption on the received packets, an encapsulation unit 113 and an encryption unit 114 for carrying out the encapsulation and encryption on transmission packets, a cryptosystem parameter setting unit 118 for setting cryptosystem parameters with respect to the correspondent host, a cryptosystem parameter memory 119 for storing the cryptosystem parameters set by the cryptosystem parameter setting unit 118, a current location address management unit 116 for managing the current location address of the mobile computer and updating the current location address in the cryptosystem parameters stored by the cryptosystem parameter memory 119, and a home address memory 117 for storing the home address of the mobile computer.

Figure 12:
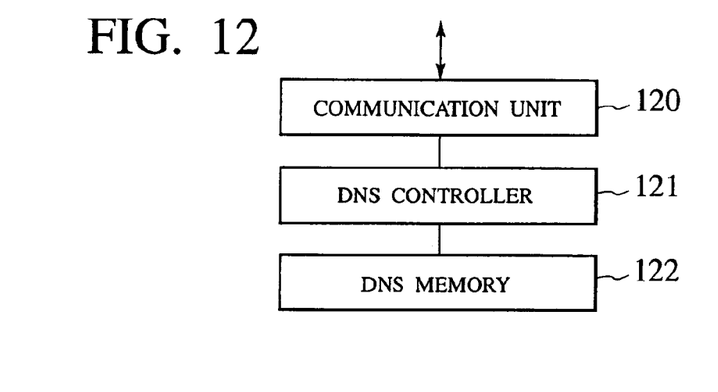
FIG. 12 is a block diagram showing an exemplary internal configuration of the DNS server in the mobile communication system of FIG. 2.

Also, the DNS server 4 of this embodiment has an exemplary internal configuration as shown in FIG. 12, which comprises a communication unit 120 for carrying out communications with the mobile computer 2 and the correspondent host 3, a DNS controller 121 for providing the DNS functions, and a DNS memory 122 for storing the DNS information in a form as shown in FIG. 5.

Figure 13:
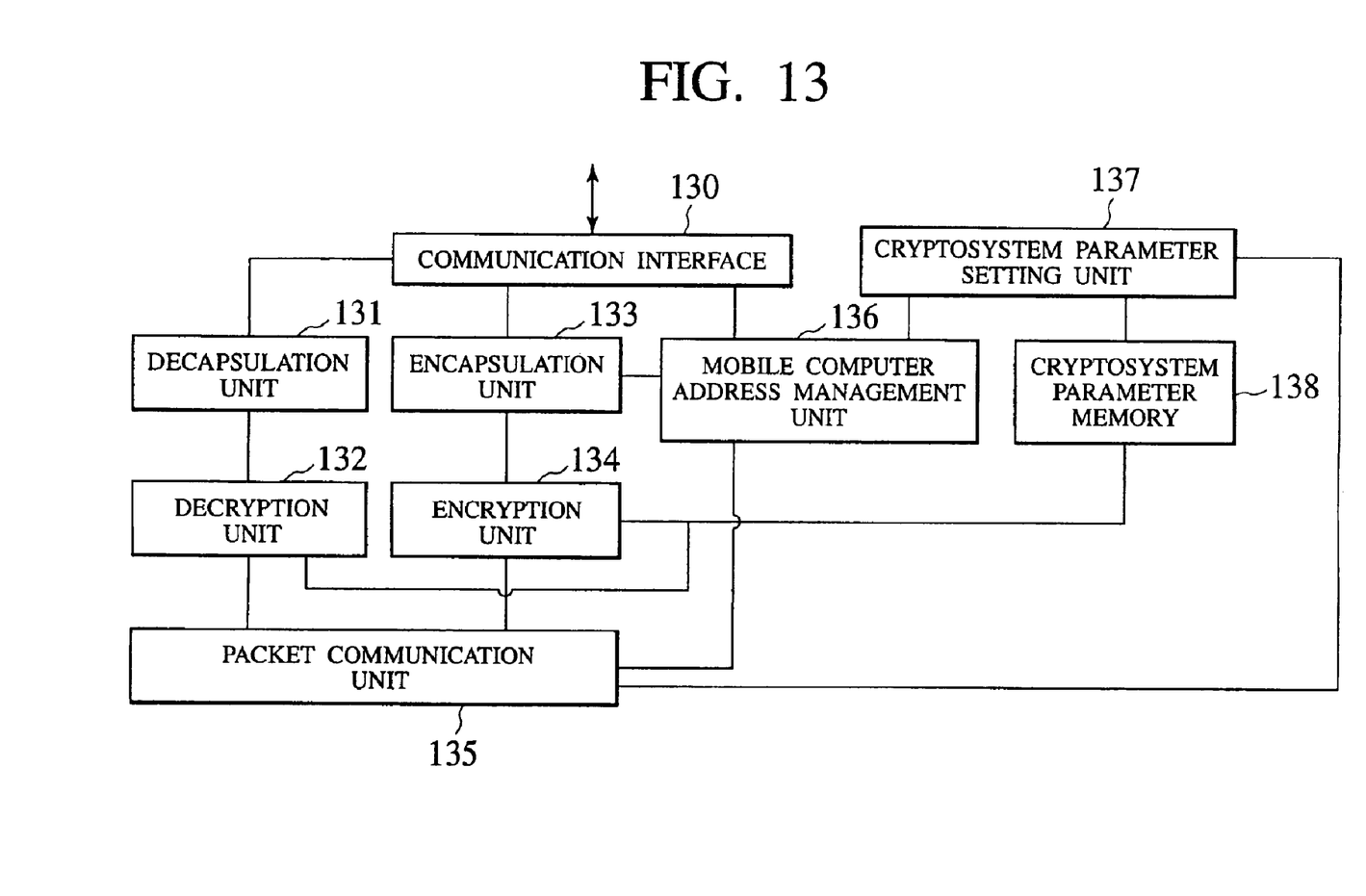
FIG. 13 is a block diagram showing an exemplary internal configuration of the correspondent host in the mobile communication system of FIG. 2.

Also, the correspondent host 3 of this embodiment has an exemplary internal configuration as shown in FIG. 13, which comprises a communication interface 130, a packet communication unit 135 for receiving or generating communication packets, a decapsulation unit 131 and a decryption unit 132 for carrying out the decapsulation and the decryption on the received packets, an encapsulation unit 133 and an encryption unit 134 for carrying out the encapsulation and encryption on transmission packets, a cryptosystem parameter setting unit 137 for setting cryptosystem parameters with respect to the mobile computer, a cryptosystem parameter memory 138 for storing the cryptosystem parameters set by the cryptosystem parameter setting unit 137, and a mobile computer address management unit 136 for managing the home address and the current location address of the mobile computer, carrying out the inquiry to the DNS server and updating the current location address in the cryptosystem parameters stored by the cryptosystem parameter memory 138.

As described, in this embodiment, the communication path to the correspondent is secured by utilizing the tunnel mode of the IPSEC which is the standard protocol. Then, the maintenance of the session at a time-of moving is guaranteed by enabling the change of the termination endpoint of the tunnel by adding a concept of the SA Gateway Update. Also, the Dynamic DNS Update is utilized and the Home Address Resource Record (HAAAA) is newly Introduced into the DNS. By the use of the resolver that utilizes these, it becomes possible to ascertain a correspondence between the home address and the Care-of address of the mobile computer, so that it becomes possible to use the home address as an identifier of the mobile computer.

Now, in the conventional Mobile IP scheme, it is necessary to provide routers called home agents in order to support mobile computers, and as a result, there are cases involving triangular routes in the communications between the mobile computer and the other host where only a packet from the other host to the mobile node is transmitted via the home agent, so that there have been the following problems.

First, the home agent must be connected to a permanently connected network, and the mobile node cannot carry out any communications if the home agent fails to function properly. These facts weaken the robustness of the mobile communications.

Second, there is a mechanism called firewall which is indispensable in the current Internet environment, but the presence of a triangular route complicates the issue of firewall passing, and this has been a hindrance to the smooth introduction of the Mobile IP scheme.

In contrast, according to the present invention, the mobile computer carries out the location change in the case of leaving the home network by changing the IPSEC tunnel termination endpoint address, so that it becomes easily possible to change a connected location on the IP network without requiring the use of a home agent, while providing a sufficient level of security. In addition, it also becomes possible to transfer a packet to a correct moved location of the mobile computer even in the case of a call to be terminated to the mobile computer from the other computer, by registering the Care-of address information in the DNS.

Thus, according to the present invention, in the communications between the moving mobile computer and its correspondent, the management and the notification of the current location address that are required in conjunction with the moving by the mobile computer can be made easier by using the encapsulated packet that uses the home address of the mobile computer as the source or destination address of the Inner packet and the current location address of the mobile computer as the source or destination address of the outer packet, so that the mobile communications of the mobile computer can be realized without any need for special routers such as home agents required in the Mobile IP scheme, and without any possibility for generating a triangular route.

It is to be noted that the above embodiment has been described for an exemplary case of using the IPSEC, but the present invention is equally applicable to the other cipher communication protocol. Also, the present invention is also applicable to any mobile management scheme including IPv4 and IPv6 which is the next generation IP. Also, the present invention is also applicable to any other mobile communication protocol.

It is also to be noted that the above described embodiment according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled In the software art.

In particular, each of the mobile computer, the correspondent host, and the DNS server of the above described embodiment can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of mobile communications between a mobile computer capable of carrying out communications while moving over inter-connected networks and a correspondent computer, the method comprising the steps of:

transmitting a packet directly to the correspondent computer from the mobile computer located at a visited site network outside a home network of the mobile computer, by encapsulating an inner packet having a home address assigned to the mobile computer at the home network as a source address, within an outer packet having a current location address acquired at the visited site network as a source address;

storing cryptosystem parameter information necessary in forming a tunnel for transferring an encapsulated packet by encrypting the inner packet, at the mobile computer and the correspondent computer;

notifying a change of the current location address of the mobile computer directly from the mobile computer to the correspondent computer by setting a new current location address as the source address of the outer packet in the packet transmitted by the transmitting step;

updating the current location address used as a termination endpoint address of the tunnel in the cryptosystem parameter information stored at the mobile computer into the new current location address, when the current location address is changed to the new current location address;

managing source addresses of the outer packet and the inner packet of the encapsulated packet received directly from the mobile computer respectively as the current location address and the home address of the mobile computer at the correspondent computer; and updating the current location address used as a termination endpoint address of the tunnel in the cryptosystem parameter information stored at the correspondent computer into the new current location address, when the change of the current location address to the new current location address is notified from the mobile computer.

2. A method of mobile communications between a mobile computer capable of carrying out communications while moving over inter-connected networks and a correspondent computer, the method comprising the steps of:

storing a current location address acquired by the mobile computer at a visited site network outside a home network of the mobile computer, and a home address assigned to the mobile computer at the home network, in correspondence to a host name of the mobile computer, at a computer management device;

updating the current location address stored at the computer management device, according to a notification regarding the current location address received directly from the mobile computer;

making an inquiry about the mobile computer directly from the correspondent computer to the computer management device, before initiating a packet transmission to the mobile computer at the correspondent computer;

returning a response from the computer management device in response to the inquiry for the current location address of the mobile computer and the home address of the mobile computer received directly from the correspondent computer; and transmitting a packet directly from the correspondent computer to the mobile computer located at the visited site network, by encapsulating an inner packet having the home address as a destination address, within an outer packet having the current location address as a destination address, when the current location address and the home address are obtained from the computer management device in response to the inquiry made by the correspondent computer.

3. A mobile computer device capable of carrying out communications while moving over inter-connected networks, the mobile computer device comprising:

a packet transmission unit configured to transmit a packet directly to a correspondent computer from a visited site network outside a home network of the mobile computer device, by encapsulating an inner packet having a home address assigned to the mobile computer device at the home network as a source address, within an outer packet having a current location address acquired at the visited site network as a source address;

a memory configured to store cryptosystem parameter information necessary in forming a tunnel for transferring an encapsulated packet by encrypting the inner packet; and a current location address management unit configured to notify a change of the current location address of the mobile computer device directly to the correspondent computer by setting a new current location address as the source address of the outer packet in the packet transmitted by the packet transmission unit, and to update the current location address used as a termination endpoint address of the tunnel in the cryptosystem parameter information stored in the memory into the new current location address, when the current location address is changed to the new current location address.

4. The mobile computer device of claim 3, wherein the current location address management unit also notifies the new current location address to a computer management device that manages the home address of the mobile computer device when the current location address is changed to the new current location address.

5. The mobile computer device of claim 3, further comprising a setting unit configured to set the cryptosystem parameter information with respect to the correspondent computer in the memory, wherein the current location address management unit updates only a portion corresponding to the current location address of the mobile computer device in the cryptosystem parameter information already set in the memory by the setting unit into the new current location address when the current location address is changed to the new current location address.

6. A computer management device provided in inter-connected networks on which a mobile computer carries out communications while moving over the inter-connected networks, the computer management device comprising:

a memory configured to store a current location address acquired by the mobile computer at a visited site network outside a home network of the mobile computer, and a home address assigned to the mobile computer at the home network, in correspondence to a host name of the mobile computer; and a management unit configured to update the current location address stored in the memory according to a notification regarding the current location address received directly from the mobile computer, and to respond to an inquiry for the current location address of the mobile computer and an inquiry for the home address of the mobile computer received directly from a correspondent computer of the mobile computer.

7. The computer management device of claim 6, wherein the memory stores an entry for the mobile computer which includes a first field storing a correspondence between the host name and the current location address of the mobile computer, and a second field storing the home address of the mobile computer in correspondence to the first field, and the management unit responds to the inquiry for the current location address by referring to the first field and to the inquiry for the home address by referring to the second field.

8. The computer management device of claim 7, wherein the first field stores the home address of the mobile computer when the mobile computer is located in the home network, or the current location address acquired at the visited site network as notified from the mobile computer when the mobile computer is located outside the home network.

9. A correspondent computer device for carrying out communications with a mobile computer which is capable of carrying out communications while moving over inter-connected networks, the correspondent computer comprising:

a memory configured to store cryptosystem parameter information necessary in forming a tunnel for transferring an encapsulated packet with respect to the mobile computer; and a mobile computer address management unit configured to manage source addresses of an outer packet and an inner packet of the encapsulated packet received directly from the mobile computer respectively as a current location address acquired by the mobile computer at a visited site network outside a home network of the mobile computer and a home address assigned to the mobile computer at the home network, and to update the current location address used as a termination endpoint address of the tunnel in the cryptosystem parameter information stored in the memory into a new current location address, when a change of the current location address to the new current location address is notified directly from the mobile computer.

10. The correspondent computer device of claim 9, wherein the mobile computer address management unit recognizes the change of the current location address from a change in a source address of the outer packet in the encapsulated packet received from the mobile computer.

11. The correspondent computer device of claim 9, further comprising:

a packet transmission unit configured to transmit a packet to the mobile computer located at the visited site network, by encapsulating an inner packet having the home address as a destination address, within an outer packet having the current location address as a destination address.

12. A correspondent computer device for carrying out communications with a mobile computer which is capable of carrying out communications while moving over inter-connected networks, the correspondent computer comprising:

a mobile computer address management unit configured to make an inquiry about the mobile computer directly to a computer management device that manages a current location address acquired by the mobile computer at a visited site network outside a home network of the mobile computer and a home address assigned to the mobile computer device at the home network, before initiating a packet transmission to the mobile computer; and a packet transmission unit configured to transmit a packet directly to the mobile computer located at the visited site network, by encapsulating an inner packet having the home address as a destination address, within an outer packet having the current location address as a destination address, when the current location address and the home address are obtained from the computer management device in response to the inquiry made by the mobile computer address management unit.

13. A computer program product for causing a computer to function as a mobile computer device capable of carrying out communications while moving over inter-connected networks, the computer program product comprising:

a first computer readable program code for causing said computer to transmit a packet directly to a correspondent computer from a visited site network outside a home network of the mobile computer device, by encapsulating an inner packet having a home address assigned to the mobile computer device at the home network as a source address, within an outer packet having a current location address acquired at the visited site network as a source address;

a second computer readable program code for causing said computer to store cryptosystem parameter information necessary in forming a tunnel for transferring an encapsulated packet by encrypting the inner packet; and a third computer readable program code for causing said computer to notify a change or the current location address of the mobile computer device directly to the correspondent computer by setting a new current location address as the source address of the outer packet in the packet transmitted by the first computer readable program code, and to update the current location address used as a termination endpoint address of the tunnel in the cryptosystem parameter information stored by the second computer readable program code into the new current location address, when the current location address is changed to the new current location address.

14. A computer program product for causing a computer to function as a computer management device provided in inter-connected networks on which a mobile computer carries out communications while moving over the inter-connected networks, the computer program product comprising:

a first computer readable program code for causing said computer to store a current location address acquired by, the mobile computer at a visited site network outside a home network of the mobile computer, and a home address assigned to the mobile computer at the home network, in correspondence to a host name of the mobile computer; and a second computer readable program code for causing said computer to update the current location address stored by the first computer readable program code according to a notification regarding the current location address received directly from the mobile computer, and to respond to an inquiry for the current location address of the mobile computer and an inquiry for the home address of the mobile computer received directly from a correspondent computer of the mobile computer.

15. A computer program product for causing a computer to function as a correspondent computer device for carrying out communications with a mobile computer which is capable of carrying out communications while moving over inter-connected networks, the computer program product comprising:

a first computer readable program code for causing said computer to store cryptosystem parameter information necessary in forming a tunnel for transferring an encapsulated packet with respect to the mobile computer; and a second computer readable program code for causing said computer to manage source addresses of an outer packet and an inner packet of the encapsulated packet received directly from the mobile computer respectively as a current location address acquired by the mobile computer at a visited site network outside a home network of the mobile computer and a home address assigned to the mobile computer at the home network, and to update the current location address used as a termination endpoint address of the tunnel in the cryptosystem parameter information stored by the first computer readable program code into a new current location address, when a change of the current location address to the new current location address is notified directly from the mobile computer.

16. A computer program product for causing a computer to function as a correspondent computer device for carrying out communications with a mobile computer which is capable of carrying out communications while moving over inter-connected networks, the computer program product comprising:

a first computer readable program code for causing said computer to make an inquiry about the mobile computer directly to a computer management device that manages a current location address acquired by the mobile computer at a visited site network outside a home network of the mobile computer and a home address assigned to the mobile computer at the home network, before initiating a packet transmission to the mobile computer; and a second computer readable program code for causing said computer to transmit a packet directly to the mobile computer located at the visited site network, by encapsulating an inner packet haying the home address as a destination address, within an outer packet having the current location address as a destination address, when the current location address and the home address are obtained from the computer management device in response to the inquiry made by the first computer readable program code.

* * * * *